Dec. 2, 1941.  R. G. LOWE  2,264,805
HOMOGENIZER
Filed Sept. 14, 1938  2 Sheets-Sheet 1

Inventor
Reginald G. Lowe
by
Barker Collings
Attorneys

Dec. 2, 1941.   R. G. LOWE   2,264,805
HOMOGENIZER
Filed Sept. 14, 1938   2 Sheets-Sheet 2

Inventor
Reginald G. Lowe
by
Barker & Collins
Attorneys

Patented Dec. 2, 1941

2,264,805

UNITED STATES PATENT OFFICE 2,264,805

HOMOGENIZER

Reginald Gretton Lowe, Whitchurch, Cardiff, England, assignor to The Brush Electrical Engineering Company Limited, Loughborough, Leicestershire, England Application September 14, 1938, Serial No. 229,976
In Great Britain September 14, 1937

10 Claims. (Cl. 252—359)

This invention comprises improvements in or relating to homogenizers and refers to that type of homogenizing valve or crusher head comprising co-operating elements presenting surfaces in close engagement or proximity one to the other, between which surfaces the fluid or mixture to be treated is forced at high pressure. An object of this invention is to provide an improved hogogenizing valve or crusher head of this kind. According to this invention a homogenizing valve or crusher head of the kind referred to has a socket or surround which encircles one of the co-operating elements and positions it in relation to the other one. Advantageously the first said element is of conical formation and the socket or surround in which it is received is conical also.

In order that the invention may be better understood, reference will now be made to the accompanying drawings, in which the three figures show, in section, various constructions of valve or crusher head according to this invention.

Figure 1:
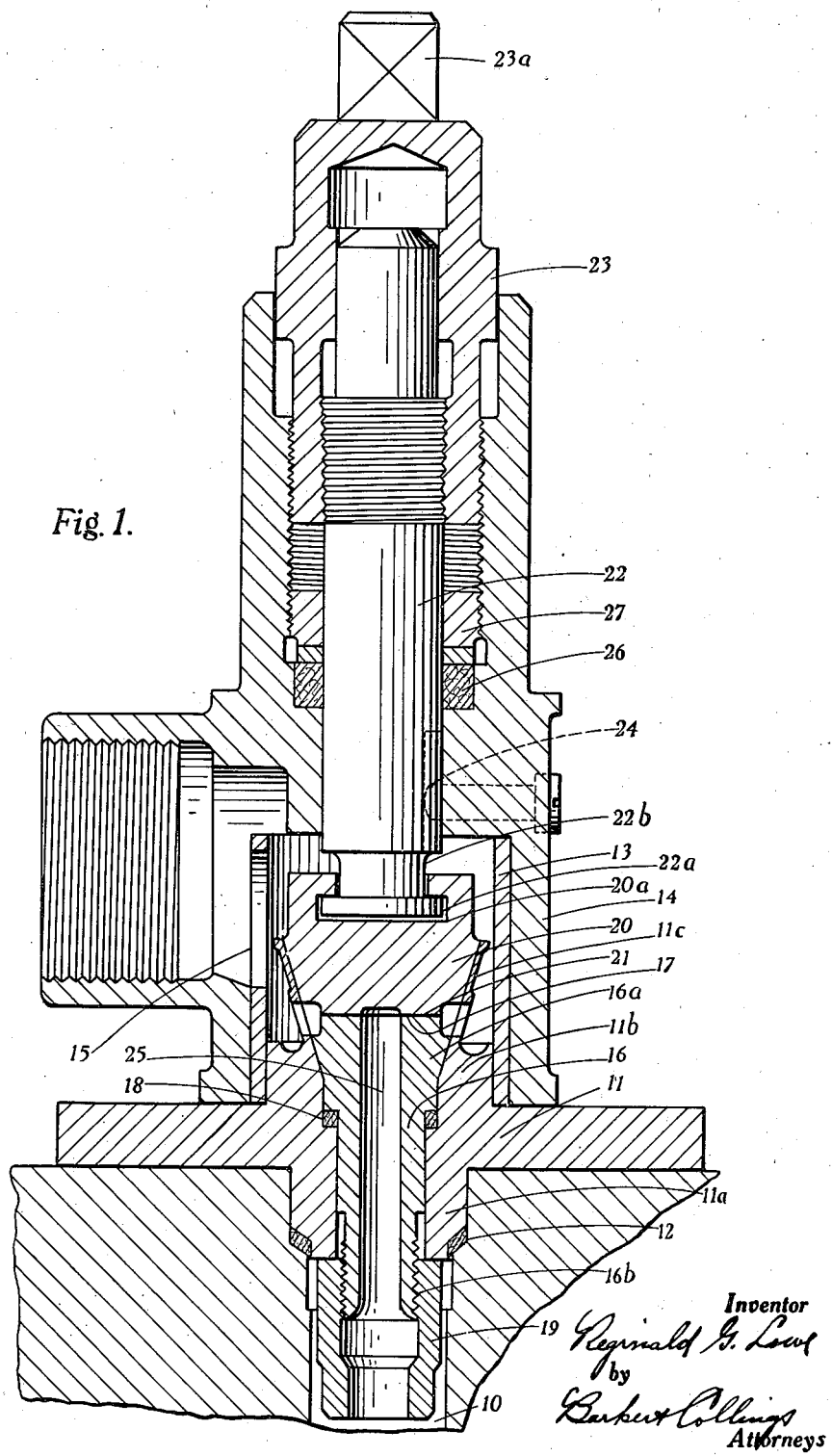

Referring first to Fig. 1, that part of the apparatus into which the fluid to be treated is pumped at high pressure comprises an elongated cylindrical chamber 10 having a suitable safety or relief valve (not shown). At one end of this cylindrical chamber is fixed a flanged member 11 with a central hollow boss projecting from each side. The boss portion 11a projecting from one side, which may be of somewhat smaller diameter than the oppositely directed boss portion 11b, fits closely into an enlarged end of the cylindrical fluid chamber 10, there being suitable packing 12 between a shoulder on said boss and a corresponding shoulder on the wall of the cylindrical chamber. The oppositely directed boss portion 11b on the flange projects a short distance into and fits closely in a tubular liner or sleeve 13 within the housing 14 of the apparatus, there being an outlet 15 through said liner and housing for the treated fluid.

Extending through and fitting axially within the aforesaid boss is a valve seating member 16 of tubular formation, i. e. a centrally bored member, one end portion 16a of enlarged diameter having a flat hardened valve face 17 and being externally coned or tapered, the bore of the aforesaid boss 11b being enlarged internally and having a tapered or flared mouth to provide a close fit for the tapered seating member. Suitable packing 18 is also advantageously provided around the seating member 16 within the boss.

The seating member is fixed in position by any suitable means. For example, a sleeve nut 19 may be screwed up tightly on a screw-threaded end portion 16b of the seating member so as to bear up against the end face of that part 11a of the boss projecting into the cylindrical fluid-receiving chamber.

From that side of the boss which accommodates the enlarged and tapered end 16a of the valve seating member 16 projects a perforated, hollow conical or funnel-shaped portion 11c integral with said boss, said funnel 11c having a comparatively thin wall and the inner face thereof being tapered to correspond to and form a continuation of the internal taper of the boss 11b accommodating the seating. Within this funnel is closely fitted with a fluid tight fit an axially movable valve member 20 having a tapered peripheral face to fit the funnel, said valve member having a hardened flat end face 21 to bear against and co-operate with the opposed face 17 of the seating 16a the face of the movable valve member 20 advantageously having a central recess of a diameter corresponding to that of the bore 25 of the seating. This construction results in the co-operating surfaces, 17, 21, being maintained in accurate parallelism.

The movable valve member 20 is loaded by a compression rod 22 extending axially therefrom, said rod having a close sliding fit within the housing 14 of the apparatus and being forced axially towards the valve so as to press same tightly on to its seating by manually operable screw mechanism of any suitable character, such for example as the differential screw mechanism shown in the drawings which may comprise a member 23 having internal and external screw threads so formed as to act in opposition to each other and have different pitches. A hand lever or the like may be fitted on the squared end 23a for effecting the required adjustment. There is also a packing 26 in the housing 14 screwed up by a gland nut 27. A key and slot or equivalent means 24 retains the rod 22 from rotation, while permitting axial movement or adjustment.

Advantageously the valve loading rod 22 is releasably connected to the movable valve member 20. For instance a substantially flat head 22a (which may have a part-spherical end face) at the end of the rod may be slid laterally into and have a close fit within an undercut recess 20a in the valve. This enables the valve to be removed and renewed or interchanged as desired. At the back of the headed end of the rod is a neck 22b having a diameter smaller than that of the remainder of the rod. This reduced neck constitutes the axially compressible portion of the valve loading rod.

By adjustment of the screw mechanism 23 the faces 17, 21, are set in exceedingly close proximity. The fluid or mixture to be treated is pumped under high pressure into the chamber 10 and emerges from between said faces 17, 21. A high loading is thereby exerted on the member 20, and it may be that the resultant compression of the compression neck 22b and compressive deformation of the contacting surfaces of the head 20a and the valve member 20, produces or increases the minute gap between said faces 17, 21. The fluid egressing from the homogenizing gap passes out through the aforesaid holes in the funnel-shaped valve housing 11c, and if desired either or both of the tapered valve members 16, 20, in said funnel may be externally fluted or be circumferentially recessed to provide a small cavity immediately beneath the perforations in the funnel.

Provision may also be made for variably adjusting the effective size of the perforations in the funnel such as by providing a truncated conical ring or cowl closely encircling the funnel and having a series of holes therein, the rotary adjustment of the ring covering or uncovering the perforations in the funnel to any required degree.

The perforated housing accommodating the movable valve member is so constructed or provided as to be in a state of tension when the said movable valve is fitted therein, and the degree of tension can be adjustably determined by different sections or thicknesses of metal and/or by different types of metal to suit different conditions of working and/or types of fluid being treated. If desired, the housing may be of reduced thickness at that half or part that is not perforated, i. e. the part of larger diameter, thereby equalizing as far as possible the strength of the metal of the funnel.

The tension on the part 11c varies with the load on the member 22 proportionately to the pressure at which homogenization takes place. Consequently, as the part 20 is forced further into said part 11c, thus increasing the pressure, there is greater need for accurate registration to prevent flutter at the valve face. This is met by the fact that as the tapered part 11c is placed under greater tension, the moving valve face is more accurately located.

Figure 2:
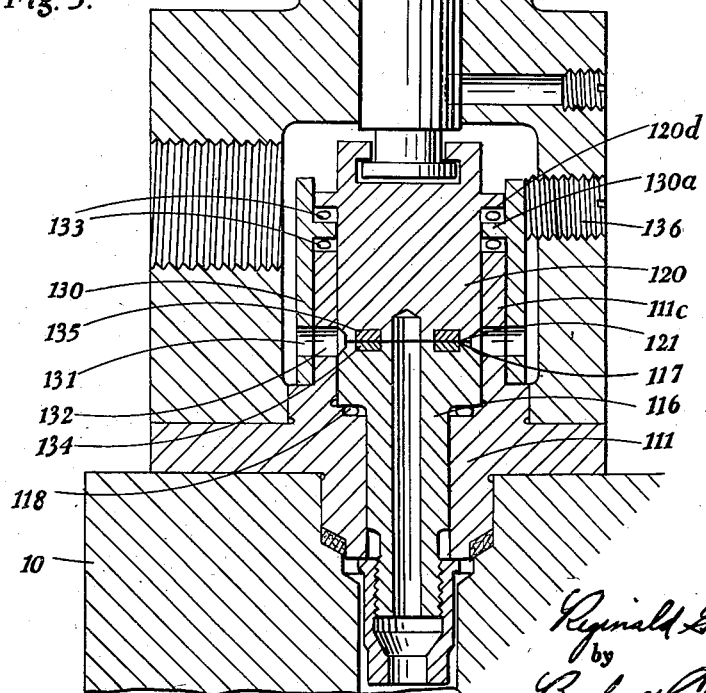

In the construction shown in Fig. 2 both of the valve members 116 and 120 are of cylindrical form. Therefore the seating or surround 111c which surrounds and positions the movable valve member 120 is cylindrical also. This surround 111c is integral with the member 111 in which the valve member 116 is received, and it is perforated, at a level coincident with the gap between the homogenizing faces 121 and 117, with apertures.

Surrounding the said seating or surround 111c there is a sleeve 130 likewise pierced with apertures 131 corresponding to the apertures 132 in the surround 111c. This sleeve 130 is connected to the valve member 120 and is therefore not capable of any appreciable axial movement in relation to the surround 111c (because the endwise movement imparted to said member 120 is negligible). Conveniently, however, the said sleeve 130 is capable of rotational adjustment. For this purpose it may be provided with an inturned flange 130a received between the top edge of the surround 111c and a flange 120d on said valve member. Desirably suitable packing indicated at 133 is interposed between the faces of the flange 130a, flange 120d, and the top of the surround 111c. This packing maintains a fluid tight joint between the guide or surround 111c and the valve member 120, and between said surround 111c and the sleeve 130, while permitting relative rotational adjustment of the two parts last-mentioned. Gas-filled rings are conveniently used as the packing and it may here be mentioned that a gas-filled ring may be used as the packing 118, Fig. 2 between the fixed valve member 116 and the flanged member 111 receiving it; likewise the packing 18 of Fig. 1 may be a gas-filled ring.

The sleeve 130 may be adjusted rotationally to bring the apertures 131, 132 into and out of register to diminish or increase the area available for the outward passage of the material to be treated. Thus the apparatus may be arranged to provide, between the surround or socket 111c and the sleeve 130, a second homogenizing stage.

If desired the ground and hardened homogenizing faces 117 and 121 of the stationary valve seating member 116 and the movable valve member 120 may each be provided with a self-aligned ring such as 134 and 135. These rings register with and are adapted to bear one upon the other and are so mounted as to ensure perfect parallelism in the homogenizing gap. They may be movably assembled so that they can be renewed if and when desired.

Any suitable means may be provided for effecting the rotary adjustment of the sleeve 130 and at least one grub screw 136 or the like may be provided for securing said sleeve in the adjusting position.

The remaining details of the valve or crusher head shown in Fig. 2 are similar to those of that shown in Fig. 1 and therefore need no further description.

Figure 3:
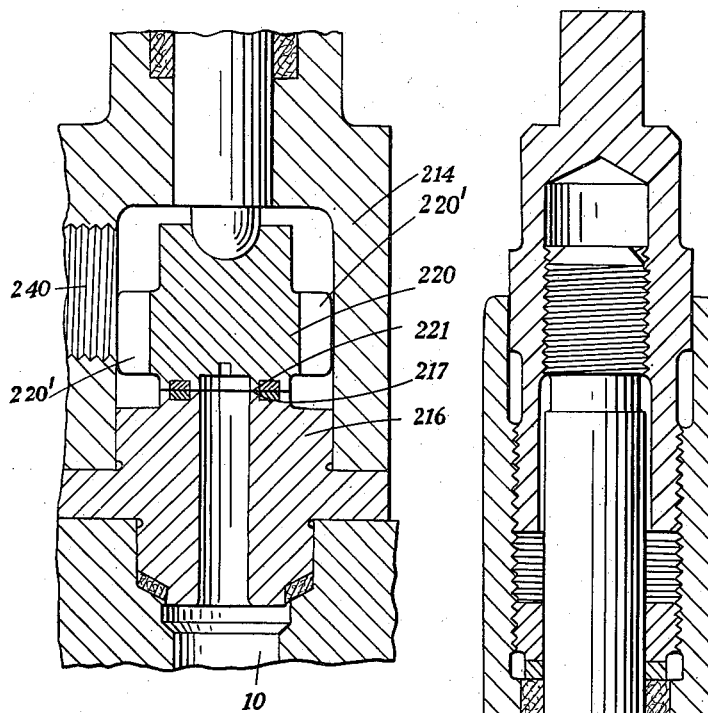

In the modified construction shown in Fig. 3, in the main only those parts of the valve or crusher head which differ substantially from those of the heads shown in Figs. 1 and 2 are illustrated. As before there is a stationary valve member 216 and a movable valve member 220 having hardened and ground end faces 217 and 221 arranged to be located in close proximity; the movable valve member 220 is provided with a fluted periphery and the axially-extending flutes or grooves 220' provide a passage of the material to be treated to the exit 240. In this construction the surround or guide for the movable valve member 220 is constituted by the interior surface of the housing 214 of the apparatus. Furthermore the fixed valve member 216 is received directly in a suitable bore in the walls of the fluid chamber 10 and it is provided with a portion which spigots in the aforesaid bore of the casing 214.

Apparatus constructed in accordance with the present invention permits of accurate registering or alignment of the valve members and provides under all conditions an absolutely parallel homogenizing gap. Also the possibility of flutter at the gap faces with consequent irregular fluid emission is effectively avoided. Additionally, both the movable valve and the seating are readily removable for renewing or interchanging, and the hardening of the valve faces is facilitated, while all parts of the apparatus including the valve members can be made of stainless steel or other suitable non-corrosive metal, and the parts can be heat treated where necessary.

In apparatus according to the present invention two or more valves may be operated in series, thereby providing a plurality of stages of homogenization.

I claim:

1. A homogenizing valve or crusher head of the kind referred to, having valve members formed with co-operating and opposed end faces between which the material to be treated is forced, and a surround encircling one of said members and positioning it in relation to the other one, which surround is perforated with apertures registering with said faces.

2. A valve or head according to claim 1, having a sleeve encircling said surround, which sleeve is perforated with apertures and is adjustable to vary the degree of register of the two sets of apertures.

3. A homogenizing valve or crusher head of the kind referred to, having valve members formed with co-operating and opposed end faces between which the material to be treated is forced, one of which members is of truncated conical formation, and a conical socket associated with the other member and receiving the conical member which socket is provided with apertures registering with said co-operating faces.

4. A homogenizing valve or crusher head of the kind referred to, having opposed valve members formed with co-operating end faces arranged to provide a minute gap between them for the passage of the material to be treated, one of which members is of conical form, and a perforated conical socket, in which conical socket the conical member is closely received and thereby positioned.

5. A homogenizing valve or crusher head of the kind referred to, having opposed valve members formed with substantially flat co-operating homogenizing faces arranged to provide a minute gap between them for the passage of the material to be treated, one of which members is conical, a conical thin-walled socket for receiving and positioning said conical member in relation to the other member, and means for adjusting said members towards and away from one another.

6. A homogenizing valve or crusher head of the kind referred to, having opposed valve members formed with co-operating and opposed end faces arranged to provide a minute gap between them for the passage of the material to be treated, one of which members is conical, and a conical thin-walled extension projecting beyond said end face of the other member to receive closely and to position the conical valve member, which extension has perforations in its walls registering with the minute gap.

7. A homogenizing valve or crusher head of the kind referred to, comprising a casing, two removable valve members positioned therein having opposed cooperating end faces in close proximity to provide a minute homogenizing gap between them, one of which valve members is of truncated conical form, a seating in which the other valve member is secured, a conical thin-walled sleeve projecting from said seating beyond the gap and closely receiving the truncated conical member, a conduit leading through the first member to the centre of the co-operating end faces, apertures in the sleeve registering with the gap, and means for adjusting the conical valve member towards and away from the other valve member.

8. A homogenizing valve or crusher head, comprising a casing, two valve members, each providing a valving surface, positioned in said casing to provide a minute homogenizing gap between said valving surfaces under working conditions, a conduit leading to and a conduit leading from said gap, which conduits communicate one with the other by way of the homogenizing gap, one of which valve members is provided with a conical locating surface other than its valving surface, a thin-walled locating funnel rigidly associated with the other valve member and provided with a conical locating surface closely engaging the first said conical locating surface, and loading means for urging the two said conical surfaces into tight engagement and for urging the valving surfaces toward one another.

9. In a homogenizing valve or crusher head, a pair of valve members having opposed valving surfaces in proximity one to the other between which the matter to be treated may be forced at high pressure, one of said valve members having a tapered positioning surface other than its said valving surface; and a thin-walled positioning member mounted adjacent said valve members, having a tapered surface complemental to and intimately engageable by said first mentioned tapered surface to position the movable valve member relative to its companion member.

10. In a homogenizing valve or crusher head, co-operating valve members formed with opposed slightly spaced valve faces between which the material to be treated is forced, one of said members being movable relative to the other and provided with a tapered locating surface, other than its valve face; a thin-walled funnel-shaped locating member rigidly mounted adjacent said valve members, provided with a locating surface complemental to said tapered locating surface of said valve member; and means for urging said movable valve member toward its companion member, whereby its tapered locating surface is brought into intimate engagement with the complemental surface of said funnel-shaped member.

REGINALD GRETTON LOWE.